(12) United States Patent
Campbell

(10) Patent No.: US 8,127,522 B2
(45) Date of Patent: Mar. 6, 2012

(54) ROTARY CUTTING UNIT WITH DEFLECTION BAFFLE

(75) Inventor: Chad W. Campbell, Raleigh, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/710,993

(22) Filed: Feb. 23, 2010

(65) Prior Publication Data

US 2011/0203245 A1  Aug. 25, 2011

(51) Int. Cl.
  *A01D 67/00* (2006.01)
(52) U.S. Cl. .................................................. 56/320.2
(58) Field of Classification Search .............. 56/320.1, 56/320.2, DIG. 9
  See application file for complete search history.

(56) References Cited

U.S. PATENT DOCUMENTS

| | | | |
|---|---|---|---|
| 4,189,903 A | | 2/1980 | Jackson et al. |
| 5,210,998 A | * | 5/1993 | Hojo et al. ................... 56/255 |
| 5,488,821 A | | 2/1996 | McCunn et al. |
| 5,638,667 A | | 6/1997 | Ellson et al. |
| 5,765,346 A | * | 6/1998 | Benter et al. .................... 56/2 |
| 5,836,144 A | * | 11/1998 | Hohnl et al. ................ 56/320.1 |
| 6,189,307 B1 | * | 2/2001 | Buss et al. .................. 56/320.1 |
| 6,470,663 B2 | | 10/2002 | Langworthy et al. |
| 6,490,851 B2 | * | 12/2002 | Kutsukake ................. 56/320.1 |
| 6,990,793 B2 | | 1/2006 | Osborne et al. |
| 7,055,301 B2 | | 6/2006 | Osborne et al. |
| 7,299,613 B2 | * | 11/2007 | Samejima et al. ........... 56/320.1 |
| 7,305,813 B2 | | 12/2007 | Plouraboue et al. |
| 2009/0178382 A1 | | 7/2009 | Sugio et al. |

OTHER PUBLICATIONS

Rotary decks feature rigid construction, rear discharge, and high torque motors in one tough package. Deere & Company Product catalog [online], [Retrieved on Feb. 23, 2010], Retrieved from the Internet:<URL: http://www.deere.com/en_US/ProductCatalog/GT/servlet/com.deere.u90785.cce.productcatalog.view.servlets.ProdCatProduct?pNbr=1490TC&tM=GT>.

* cited by examiner

Primary Examiner — Alicia Torres

(57) ABSTRACT

A rotary cutting unit with a deflection baffle in the cutting chamber, the deflection baffle including a bottom plate attached to the wall at the rear of the cutting chamber and increasing in width in the direction of blade rotation, and a front plate joined to the bottom curved plate and extending from the wall at the rear of the cutting chamber and sloping radially inwardly toward the center spindle in the direction of blade rotation.

16 Claims, 3 Drawing Sheets

ROTARY CUTTING UNIT WITH DEFLECTION BAFFLE

FIELD OF THE INVENTION

The present invention relates to a rotary cutting unit with a deflection baffle, and specifically to a rotary cutting unit with a deflection baffle that enhances the flow of grass clippings and minimizes stress on the cutting blade and spindle during mowing.

BACKGROUND OF THE INVENTION

Many new and existing golf courses have narrowed their fairways and expanded their rough areas on either end of the fairways. Roughs requires less care than fairways, so narrowing the fairways allows golf course operators to lower their maintenance costs. For example, irrigation requirements may be reduced if only the fairways are watered. If grasses in the roughs are allowed to grow longer, those non-irrigated areas are less brown. Trees and other aesthetic features may be located in the roughs, because roots and shade can inhibit turf growth in the fairways.

Golf course roughs must be maintained regularly using grass mowing machines that can mow the vegetation at an acceptable length and appearance. Equipment for mowing golf course roughs typically includes a traction vehicle carrying three or five rotary cutting units, each rotary cutting unit mounted on the end of a lift arm extending from the traction vehicle. A rotary cutting unit includes a cutting blade mounted to the lower end of a spindle rotated by a hydraulic motor. The lift effect of the cutting blade may help stand up the grass to provide high cut quality by the blade's cutting edge. The rotary cutting unit may be rear discharge to allow for optimal clipping dispersal and easy trimming using either the left-front or right-front unit. A rear discharge opening may be provided through a lower portion of the wall of the cutting chamber or shell.

Some rotary cutting units have features within the cutting chamber that are intended to move or deflect clippings downwardly for mulching or discharge. For example, U.S. Pat. No. 4,189,903 relates to a rotary lawn mower with a removable mulching attachment that directs clippings inwardly toward the center of the unit where they pass downwardly through the plane of the blade. U.S. Pat. No. 5,638,667 relates to a mulching mower with a wedge-shaped extension that is sloped downwardly as it extends radially outwardly. U.S. Pat. No. 6,470,663 relates to a rotary cutting unit with a spiral ramp to progressively force clippings down. As the blade rotates in the direction of the spiral, the clippings and air are pushed out of the cutting chamber through the rear outlet. U.S. Pat. Nos. 6,990,793 and 7,055,301 relate to a variable mulching system for a rotary cutting unit that is designed to help move clippings downwardly for mulching or to a discharge outlet.

Conventional deflection baffles can reduce the lift effect of the cutting blade because the grass clippings and air are pushed outwardly above the blade's cutting edge. This can result in an undesirable laying down and rolling over effect on the grass. This also can result in a high stress pressure point on the tip of the blade, which may contribute to loosening of the blade from the spindle, cracking or excess vibration.

Additionally, conventional deflection baffles may cause clippings or other material to collect and compact in areas under the cutting unit, while it is in either an open discharge position or mulching position. Clippings or other material that accumulates in the cutting chamber can decrease the blade lift and cause pressure on the top of the blade, preventing the clippings from being processed properly. This can slow the blade rotation and/or reduce cut quality, especially in heavy cutting conditions where large amounts of material are being cut.

A rotary cutting unit is needed having a deflection baffle that keeps the clippings flowing in a manner that does not restrict or compromise the performance of the unit, does not counteract the lift provided by the cutting blade, and does not cause undesirable stress and/or strain to the components of the system including the blade and joint. There is a need for a rotary cutting unit with a deflection baffle that can help stand up the grass, minimize stress to the blade tip, and that will not contribute to loosening of the blade from the spindle, cracking or excess vibration.

SUMMARY OF THE INVENTION

A rotary cutting unit has a deflection baffle mounted in the cutting chamber with a bottom plate sloped upwardly in the direction of rotation of the cutting blade, and a front plate sloped inwardly toward the spindle in the direction of rotation of the cutting blade. The deflection baffle may extend between about 45 degrees and about 90 degrees around a rear portion of the cutting chamber.

The deflection baffle keeps clippings flowing in a manner that does not restrict or compromise the performance of the unit, does not counteract the lift provided by the cutting blade, and does not cause undesirable stress and/or strain to the components of the system including the blade and joint. The deflection baffle helps stand up the grass, minimizes stress to the blade tip, and helps prevent loosening of the blade from the spindle, cracking or vibration.

DESCRIPTION OF THE PREFERRED EMBODIMENT

Figure 1:
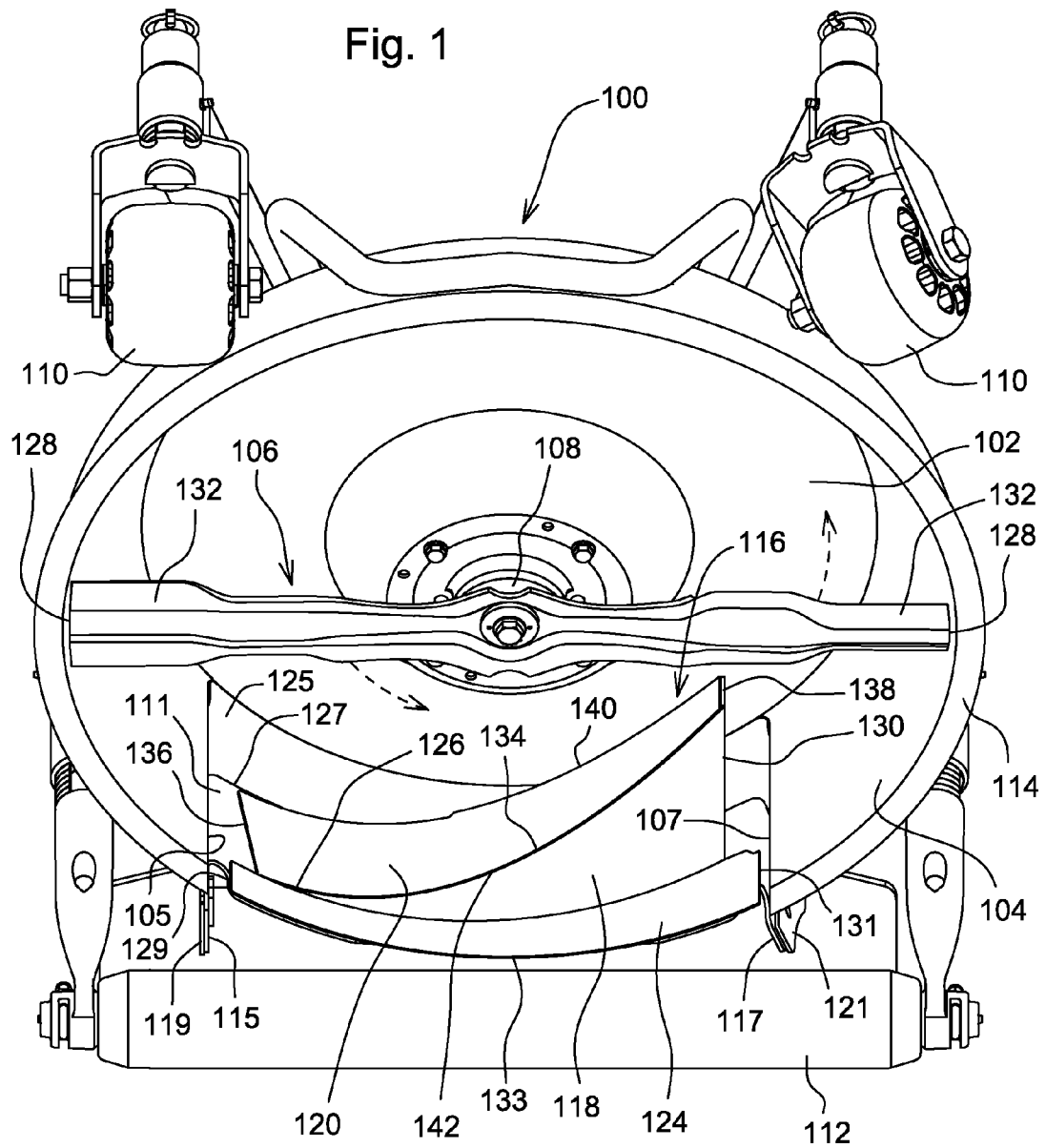
FIG. 1 is a perspective view of the underside of a rotary cutting unit with a deflection baffle according to a first embodiment of the invention.
Figure 2:
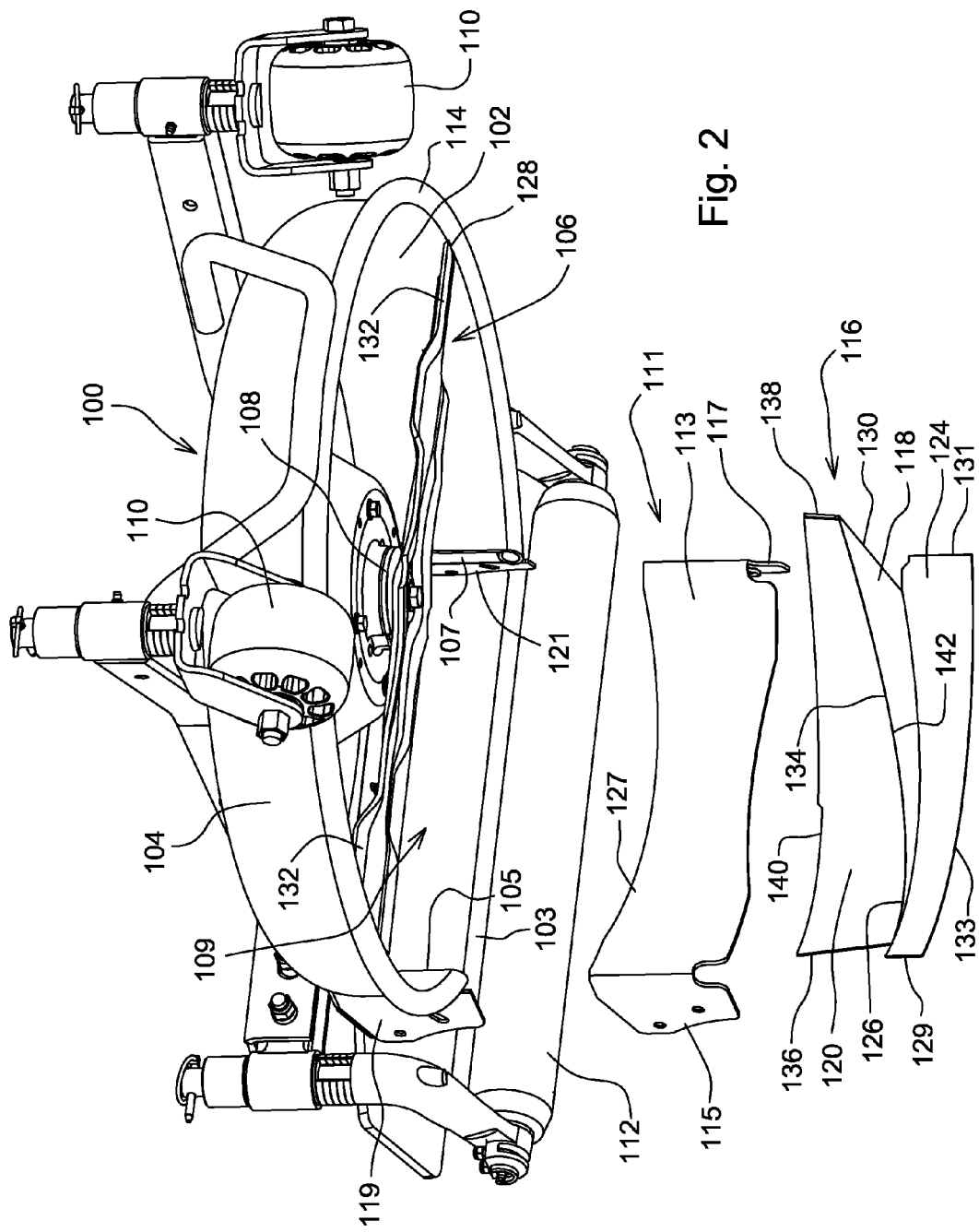
FIG. 2 is an exploded perspective view of the underside of a rotary cutting unit and deflection baffle according to a first embodiment of the invention.
Figure 3:
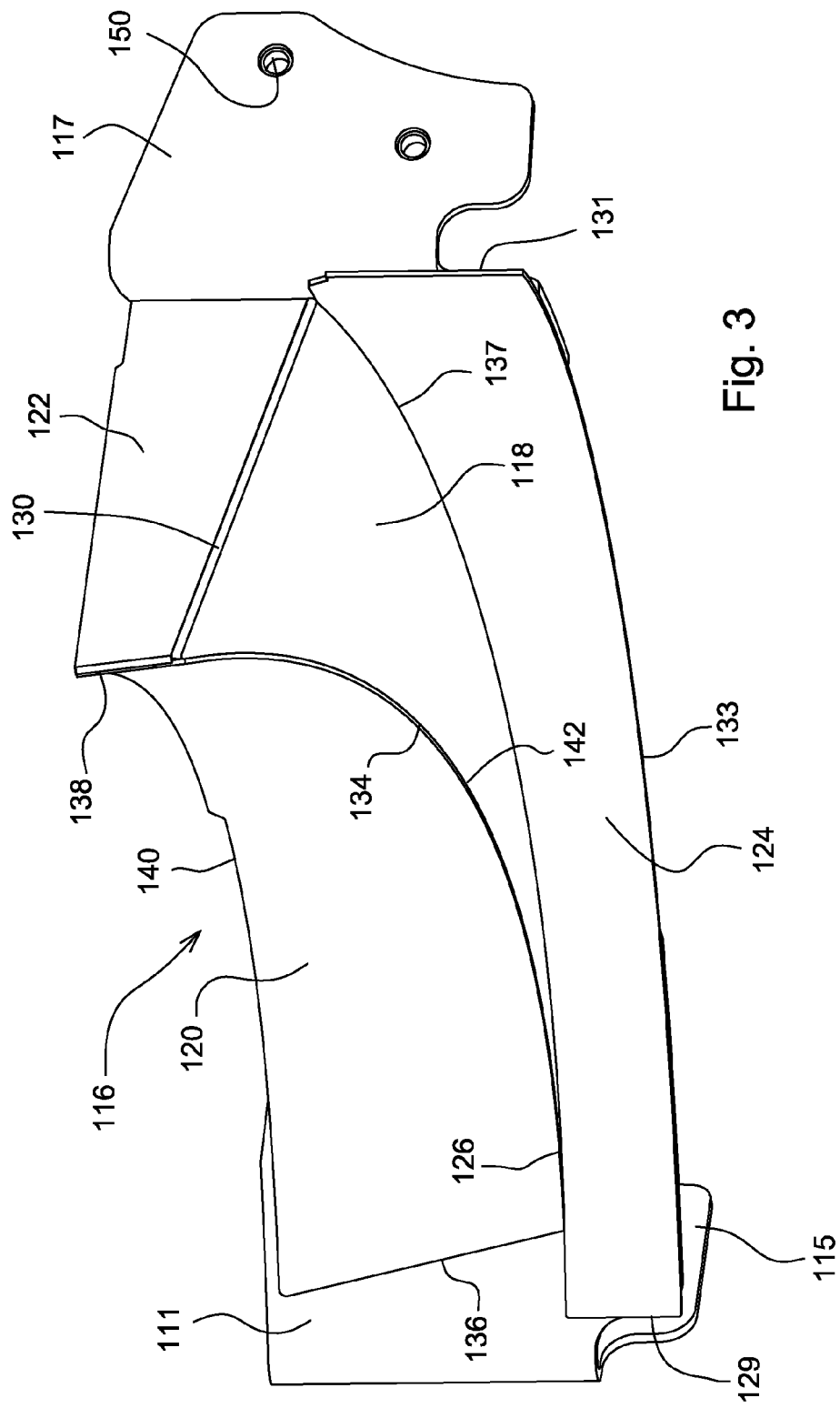
FIG. 3 is a perspective view of the deflection baffle according to a first embodiment of the invention.

As shown in FIGS. 1-3, in a first embodiment, rotary cutting unit 100 may be carried by a traction vehicle for a rough mower. The rotary cutting unit includes a circular inverted dish-shaped shell or cutting chamber 102 with a downwardly extending outer perimeter wall 104 terminating at a lower edge or lip 114. A motor such as a hydrostatic motor may be mounted to the upper top surface of the rotary cutting unit. The motor turns a cutting blade 106 attached to a generally vertically aligned center spindle 108 in the shell or cutting chamber. The rotary cutting unit may be supported over the ground surface by a front pair of rollers 110, casters or wheels, and a rear roller 112. The rotary cutting unit may be pivotably supported at the end of a lift arm which the operator may actuate with one or more hydraulic cylinders or electric lift mechanisms to raise or lower the rotary cutting unit between a mowing position and a transport position.

In one embodiment, shell or cutting chamber 102 may have rearwardly facing discharge opening 103 in outer wall 104 to provide for rear discharge of grass clippings. The rear discharge opening preferably may have a height of at least about 3 cm measured from the bottom lip 114 of wall 104 to the top of the rear discharge opening. The top of the rear discharge opening may be at or above the plane of cutting blade 106. Flat or horizontal surface 125 may be provided behind and above the rear discharge opening, extending rearwardly from the cutting chamber. The rear discharge opening may extend between about 45 degrees and about 90 degrees around the rear of the cutting chamber between first edge 105 and second edge 107. Rear discharge plate 109 may be fastened to the rear of the cutting chamber to extend over the rear discharge opening behind the unit and protect the opening while mowing.

In one embodiment, rear discharge opening 103 may be covered or closed using removable mulch plate 111. The removable mulch plate may have a central portion 113 that extends between first edge 105 and second edge 107 of the rear discharge opening, and top edge 127 that abuts surface 125 at the rear of the cutting chamber. The removable mulch plate also may have left and right end flanges 115, 117 that may be fastened to brackets 119, 121 extending behind the rear of the mower unit, so that removal or attachment of the mulch plate may be done from the outside of the cutting unit using fasteners inserted through openings 150.

In one embodiment, deflection baffle 116 may be attached to removable mulch plate 111. For example, the deflection baffle may include several components welded to the removable mulch plate. In an alternative embodiment, the deflection baffle may be positioned in the cutting chamber or shell without use of a mulch plate. For example, the deflection baffle may be welded or removably fastened to the wall of a cutting chamber or shell, preferably at or adjacent the rear of the unit.

In one embodiment, the parts of the deflection baffle may be sheet metal, metal castings or molded polymers, for example. The parts may be welded together to assemble the deflection baffle. If the parts are castings or polymers, they may be cast, formed or molded as a unitary structure. The deflection baffle may include bottom plate 118 and front plate 120, and optionally also may include end plate 122 and lower plate 124.

In one embodiment, bottom plate 118 may provide a ramp surface within cutting chamber 102 that slopes upwardly, from first end 126 to second end 130, in the direction of rotation of cutting blade 106. The first end of the bottom plate may be positioned at a level less than about 2 cm over the plane or level of the cutting blade. The second end of the bottom plate may be at a level at least about 4 cm above the plane of the cutting blade. The second end of the bottom plate may contact the underside of the shell or cutting chamber, or may be at a level less than about 2 cm from the underside.

In one embodiment, bottom plate 118 may progressively increase in width from first end 126 to second end 130 in the direction of rotation of cutting blade 106. From the first end to the second end, the bottom plate may widen at a constant rate, or may widen at an increasing rate as shown in FIG. 3 so that inner edge 134 is curved. The first end of the bottom plate may be at or adjacent the rear wall of the cutting chamber, and may be located radially outside cutting blade tip 128. For example, the first end of the bottom plate may have a width of less than about 1 cm at or adjacent the wall at the rear of the cutting chamber. The second end of the bottom plate may have a width of at least about 15 cm, measured from outer edge 137 of the bottom plate at the rear wall of the cutting chamber to inner edge 134. At the second end of the bottom plate, the inner edge is preferably located radially inside the lift or wing feature 132 of the cutting blade.

In one embodiment, outer edge 137 of bottom plate 118 may be horizontal or may slope upwardly from first end 126 to second end 130 in the direction of rotation of cutting blade 106. Inner edge 134 also may slope upwardly from the first end to the second end in the direction of rotation of the cutting blade. The inner edge of the bottom plate may have a steeper slope than the outer edge, so that the bottom plate may slope upwardly from the outer edge to the inner edge.

In one embodiment, bottom plate 118 may extend between about 45 degrees and about 90 degrees around the underside of cutting chamber 102 adjacent outer wall 104. If the rotary cutting unit includes a removable mulch plate, the bottom plate may be welded to the removable mulch plate.

In one embodiment, front plate 120 may be a ramp surface within cutting chamber 102 that slopes inwardly, from first end 136 to second end 138, in the direction of rotation of cutting blade 106. The first end of the front plate may be positioned at outer wall 104 of the cutting chamber, radially outside the tip of the cutting blade. The second end of the front plate may be positioned radially closer to center spindle 108, radially inside the lift feature of the cutting blade.

In one embodiment, front plate 120 may progressively decrease in height from first end 136 to second end 138 in the direction of rotation of cutting blade 106. From the first end to the second end, the front plate may shorten at a constant rate or at an increasing rate as shown in FIG. 3. The first end of the front plate may be at or adjacent the rear wall of the cutting chamber, and may be located radially outside cutting blade tip 128. For example, the first end of the front plate may have a height of at least about 4 cm at or adjacent the wall at the rear of the cutting chamber, measured from upper edge 140 to lower edge 142. The second end of the front plate may be positioned radially inwardly from the first end, closer to the center spindle, and radially inside the lift or wing feature 132 of the cutting blade. The second end of the front plate may have a height of less than about 3 cm, measured from the upper edge to the lower edge.

In one embodiment, lower edge 142 of front plate 120 may slope upwardly from first end 136 to second end 138 in the direction of rotation of cutting blade 106. Upper edge 140 may be horizontal and may be positioned at the underside of the cutting chamber, or within about 1 cm of the underside of the cutting chamber.

In one embodiment, lower edge 142 of front plate 120 may be welded to inner edge 134 of the bottom plate. As a result, if the bottom plate widens at an increasing rate as shown in FIG. 3 so that the inner edge is curved, the lower edge of the front plate also may be curved. The front plate may be generally vertically aligned in the cutting chamber, or may be aligned so that its top edge 140 is located closer radially to the center spindle than its lower edge.

In one embodiment, front plate 120 may extend between about 45 degrees and about 90 degrees around the underside of cutting chamber 102. If the rotary cutting unit includes a removable mulch plate, the front plate may be welded to the removable mulch plate.

In one embodiment, second end 130 of bottom plate 118 may be spaced from the underside of cutting chamber 102. Optionally, end plate 122 may be positioned between the bottom plate and the underside of the cutting chamber. For example, the end plate may be joined by welds to the bottom plate and to the front plate, so that the end plate fills the gap between the underside of the cutting chamber and the second ends of the bottom plate and front plate. If the second end of the bottom plate is spaced from the underside of the cutting chamber, it may provide a discontinuous surface that enhances turbulence of the grass clippings and air while mowing. Alternatively, the second end of the bottom plate may contact the underside of the cutting chamber, and end plate 122 may be omitted.

In one embodiment, lower plate 124 optionally may be positioned directly below and abutting outside edge 137 of bottom plate 118. Lower plate 124 may have a lower edge 133 at or about the level of lip 114 of wall 104, and may have a curved surface corresponding to the radius of curvature of the wall. Lower plate may have a constant height between first end 129 and second end 131, or may increase in height to correspond to the outside edge of the bottom plate.

In one embodiment, deflection baffle 116 may provide an upward flow path for clippings and air from the outer areas of the cutting chamber toward the center of the cutting chamber, until the material is radially inside the lift/wing feature of the cutting blade. More specifically, front plate 120 may cause rolling circulation of clippings inwardly toward the center of the cutting chamber. Bottom plate 118 slopes up and away from the tip of the cutting blade, urging clippings toward the center of the cutting chamber without pushing them down on the tip of the cutting blade.

Having described the preferred embodiment, it will become apparent that various modifications can be made without departing from the scope of the invention as defined in the accompanying claims.

The invention claimed is:

1. A rotary cutting unit, comprising:
   a cutting chamber with a discharge outlet in a rear outer wall;
   a cutting blade mounted to a center spindle for rotation within the cutting chamber;
   a deflection baffle mounted and attached between a first edge and a second edge of the discharge outlet in the rear outer wall and having a bottom plate increasing in width in the direction of blade rotation and having an inner edge sloping upwardly in the direction of blade rotation and an upper edge spaced from the underside of the cutting chamber by a gap; and a front plate joined to the inner edge of the bottom plate and extending from the wall at the rear of the cutting chamber and sloping inwardly toward the center spindle in the direction of blade rotation.

2. The rotary cutting unit of claim 1 wherein the bottom plate has a first end and a wider second end, and the front plate has a first end and a shorter second end.

3. The rotary cutting unit of claim 2 further comprising an end plate joined between the second end of the bottom plate and the second end of the front plate.

4. The rotary cutting unit of claim 1 wherein the deflection baffle includes a lower plate mounted below the bottom plate.

5. The rotary cutting unit of claim 1 wherein the deflection baffle is attached to a removable mulch plate.

6. The rotary cutting unit of claim 1 wherein the bottom plate extends between about 45 degrees and about 90 degrees around the cutting chamber.

7. A rotary cutting unit, comprising:
   a cutting chamber with a cutting blade mounted on a center spindle;
   a discharge opening through a wall at the rear of the cutting chamber;
   a removable mulch plate attached to the wall and extending around the wall within the span of the discharge opening;
   a bottom plate attached to the removable mulch plate and sloping upwardly away from the cutting blade and increasing in width toward the center spindle; and
   a front plate attached to the removable mulch plate and to the bottom plate and decreasing in height and sloping toward the center spindle;
   the bottom plate and the front plate extending around the wall within the span of the discharge opening.

8. The rotary cutting unit of claim 7 wherein the cutting blade rotates in a first direction, and the bottom plate increases in width in the first direction.

9. The rotary cutting unit of claim 7 wherein the cutting blade rotates in a first direction, and the front plate decreases in height toward the center spindle in the first direction.

10. The rotary cutting unit of claim 7 further comprising an end plate attached between the bottom plate and the front plate.

11. The rotary cutting unit of claim 7 further comprising a lower plate attached to the removable mulch plate below the bottom plate.

12. The rotary cutting unit of claim 7 wherein the front plate extends between about 45 degrees and about 90 degrees around the cutting chamber.

13. The rotary cutting unit of claim 7 wherein the bottom plate has an upwardly sloping inner edge.

14. A rotary cutting unit, comprising:
   a cutting chamber having a rear discharge outlet and a cutting blade mounted to a spindle rotatable in a first direction; and
   a deflection baffle removably mounted between a first edge and a second edge of the rear discharge outlet of the cutting chamber and including a bottom plate having an inner edge that slopes upwardly in the direction of rotation within a perimeter of the cutting blade and an upper edge that is spaced from an underside of the cutting chamber by a gap; and
   a front plate that slopes inwardly toward the spindle in the direction of rotation of the cutting blade.

15. The rotary cutting unit of claim 14 wherein the cutting blade has a lift feature, and the inner edge of the bottom plate extends radially inside the lift feature of the cutting blade.

16. The rotary cutting unit of claim 14 wherein the deflection baffle extends between about 45 degrees and about 90 degrees around a rear portion of the cutting chamber.

* * * * *